US006903836B2

(12) United States Patent
Meade, II et al.

(10) Patent No.: US 6,903,836 B2
(45) Date of Patent: Jun. 7, 2005

(54) HARD COPY COST RECOVERY SYSTEMS, AN APPARATUS FOR TRACKING USAGE INFORMATION FOR A HARD COPY DEVICE, HARD COPY DEVICES, AND A USAGE ACCOUNTING METHOD

(75) Inventors: William Kendall Meade, II, Eagle, ID (US); Clint S. Cuzzo, Star, ID (US); Paul Leclerc, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/393,724

(22) Filed: Sep. 10, 1999

(65) Prior Publication Data

US 2003/0137685 A1 Jul. 24, 2003

(51) Int. Cl.[7] ............................. G06F 3/12; G06F 13/00
(52) U.S. Cl. ..................................... 358/1.15; 358/1.13
(58) Field of Search ............................ 358/1.15, 1.18, 358/1.13, 1.17, 1.14; 709/102, 203, 229, 319; 710/5, 20; 399/79

(56) References Cited

U.S. PATENT DOCUMENTS

| 5,537,626 A | | 7/1996 | Kraslavsky et al. ......... 395/828 |
| 5,668,803 A | | 9/1997 | Tymes et al. ................ 370/312 |
| 5,699,493 A | | 12/1997 | Davidson, Jr. et al. ...... 395/114 |
| 5,933,584 A | * | 8/1999 | Maniwa ....................... 395/114 |
| 6,025,925 A | * | 2/2000 | Davidson, Jr. et al. ..... 358/1.15 |
| 6,052,547 A | * | 4/2000 | Cuzzo et al. ................. 399/79 |
| 6,356,359 B1 | * | 3/2002 | Motamed .................... 358/1.18 |

FOREIGN PATENT DOCUMENTS

| EP | 0542462 A2 | 11/1992 | .......... G03G/15/00 |
| EP | 0996041 A2 | 4/2000 | .......... G03G/21/02 |

* cited by examiner

Primary Examiner—Douglas Tran

(57) ABSTRACT

An apparatus for tracking usage information for an image forming device is provided which includes an image forming device, processing circuitry and memory. The processing circuitry is associated with the image forming device and is operative to detect consumable usage information at the image forming device. The memory is coupled with the processing circuitry and is operative to store a data file containing the user information, the output job information, and the usage information. A method is also provided.

21 Claims, 3 Drawing Sheets

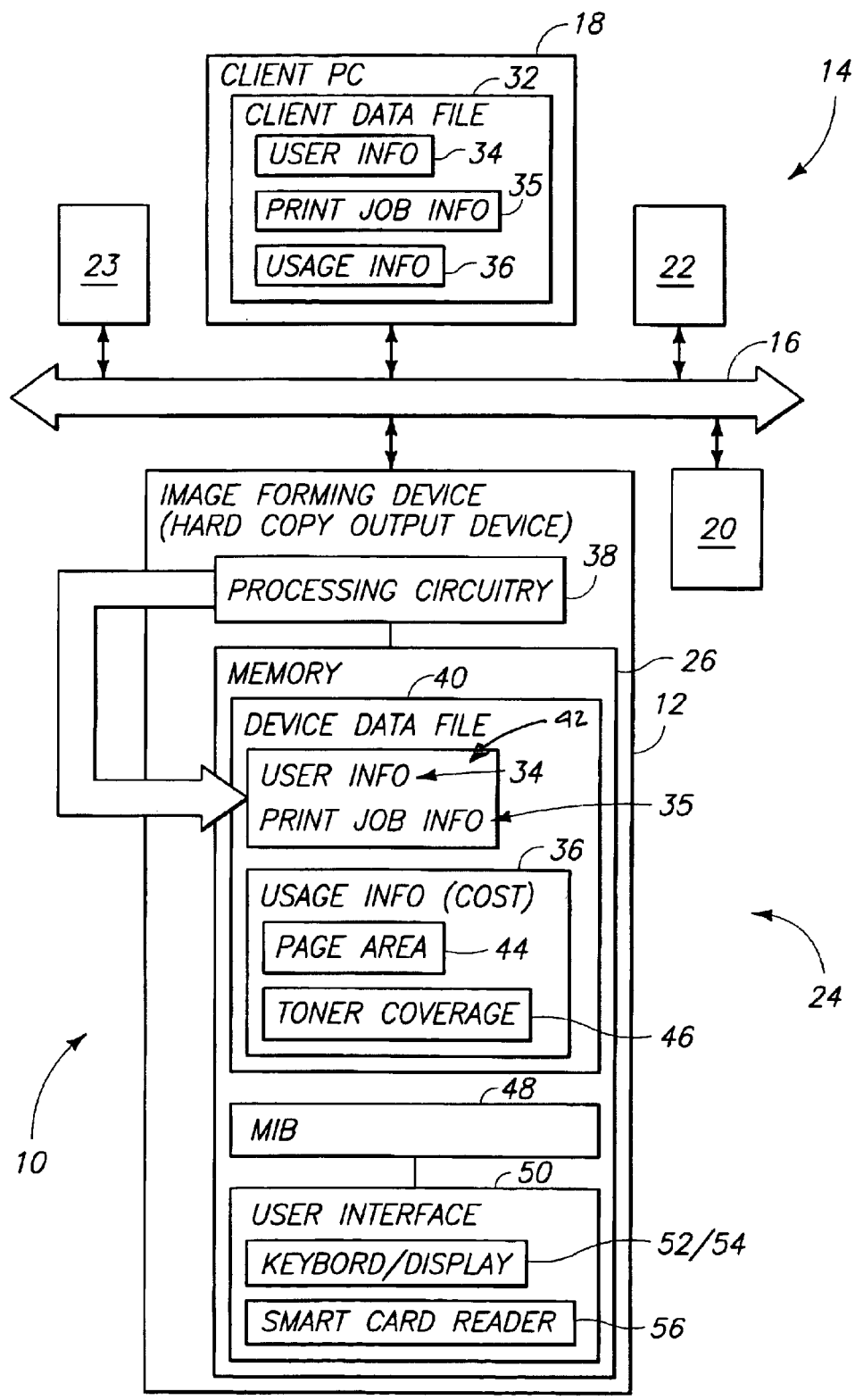

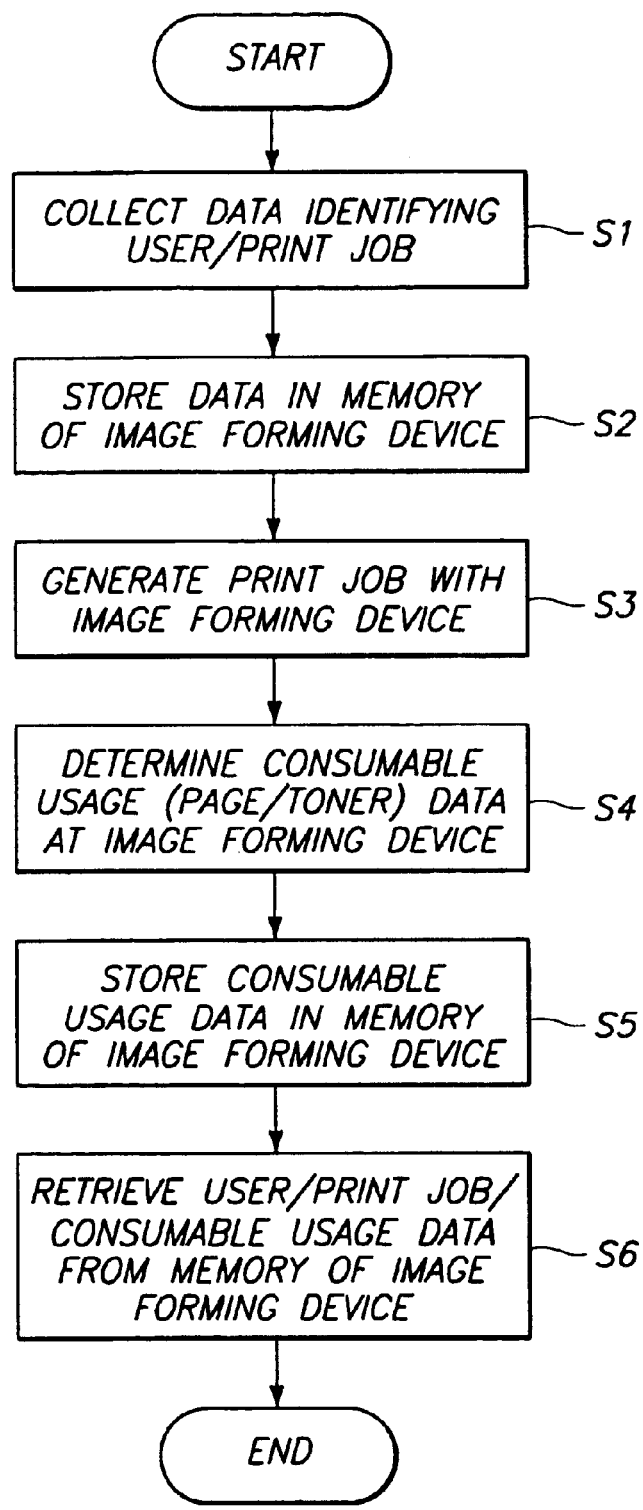

HARD COPY COST RECOVERY SYSTEMS, AN APPARATUS FOR TRACKING USAGE INFORMATION FOR A HARD COPY DEVICE, HARD COPY DEVICES, AND A USAGE ACCOUNTING METHOD

FIELD OF THE INVENTION

This invention relates to the field of computer systems. More particularly, this invention relates to an apparatus and a method for acquiring paper and toner usage information at an output device such as a printer.

BACKGROUND OF THE INVENTION

Prior solutions exist for tracking copy jobs requested at a hard copy device. Typically, these solutions are referred to generally as cost recovery systems. One such system is sold by Equitrac Corporation, 836 Ponce de Leon Blvd., Coral Gables, Fla. 33134, and includes a DCT control terminal, Printlog software, and a transaction server. Such system forms a cost recovery system that uses client-based software that is installed within a user's environment, typically on a client PC. Details of such system are available on the Internet at Equitrac's website, http://www.equitrac.com. However, there are several disadvantages of such prior art systems in that they provide incomplete information and they are costly.

One problem with prior art cost recovery systems is that information made available tends to be insufficient to track many kinds of print jobs. For example, server-based systems offer support on a specific network protocol only, and consequently cannot track who printed print jobs that use certain other protocols. For example, Blue Lance is a server-based system that offers support only on Novell IPX and cannot track print jobs that use TCP/IP, Netbui, or Netbios protocols.

Another problem with prior art cost recovery systems is that special software needs to be installed on the server-based hard copy device. For example, Equitrac systems require the use of Printlog software. The addition of such software complicates the system environment. Solutions like those provided by Equitrac, that require client-based software to be installed, are difficult to implement, debug, and maintain, particularly when implemented within environments that have many client PCs. For example, the difficulty of having to install software on every client in a 1,500 seat PC environment would be enormous.

Yet another problem with prior art cost recovery systems is that they tend to be highly inaccurate at counting paper usage, and tend to only guess at toner usage. Inaccuracies result from miscounting, counting the wrong events, guessing at toner usage, and estimating actual paper costs. This problem tends to be the most significant factor in why prior art cost recovery systems are inadequate.

Miscounting by prior art cost recovery systems leads to inaccuracy because present solutions that rely on client-PC software count pages that are considered as having been printed once they have been sent to the hard copy device. However, the sending of a print job to a hard copy device does not always lead to an actual print job being realized on the hard copy device. For example, where the hard copy device is a laser printer, and if the printer jams, a server print queue gets reset, and/or a proof and hold job is cancelled, the pages in the print job are counted even though they are not printed. However, no such print job has actually occurred, which means that the number of pages that has been counted is inaccurate.

Counting the wrong event occurs when counting is carried out at the wrong location by prior art cost recovery systems. Inaccuracy results because count data representing the number of pages sent in a print job is taken from the wrong place in the print process. The best place to count hard copy pages that have been printed is on the output side of a hard copy device. However, prior art techniques do not count at this location. For example, where the hard copy device is a laser printer, the count should be carried out at a more accurate location. Only by counting at a more accurate location will the system know for sure what has been printed. Prior art techniques take measurements upstream of the fuser, usually by counting the pages that are submitted for printing by a print job request. However, such measurements taken upstream from the fuser are subject to confounding by such things as PC, LAN, server, printer replenishables availability, end-users getting frustrated, power-cycling of the device, and walk-up print on demand which calls up print jobs that are stored in memory on the device (and where Equitrac is provided on a system, Equitrac cannot count such print jobs).

Another disadvantage of prior art solutions is caused because guessing and/or overly broad averaging is implemented in order to determine the amount of toner that has been utilized. Typically, many cost recovery systems assume that toner coverage is approximately 8% of page area that is used in a print job. However, actual toner coverage can vary significantly from this rough estimate, or guess. For the few cases where toner coverage is measured, it is typically measured so infrequently that there is little or no possibility that individual users can be accurately charged for the toner usage that has occurred when submitting their individual print jobs. For example, these few systems will measure toner usage over a monthly or annual basis, or upon the renewal of a pay-per-page contract, which tends to happen infrequently.

Yet another disadvantage of prior art solutions is caused when rounding and overly broad averaging is utilized in order to estimate paper usage or cost. Present cost recovery systems count "clicks" utilizing a simple electromechanical counter that is affixed to the hard copy output device. For example, a relatively simple electromechanical counter is provided on many copy machines. Such electromechanical counter device is similar to a car odometer which increments one unit for each page that is output by the device. Typically, letter size paper and legal size paper are each counted as one "click". Ledger size is typically counted as two "clicks". However, this does not make the paper usage cost proportional to the actual usage. For example, legal size paper will utilize more paper than the letter size page, and will incur greater costs proportionately thereto. Accordingly, utilization of simple electromechanical counter devices on a hard copy output device only roughly estimates paper costs. Accordingly, customers are charged one "click", two "clicks", or four "clicks" per impression, rather than in more accurate mathematical proportion to the paper that is actually used. As a result, the methodology of rounding the number of "clicks" makes tracking paper costs easier to understand, but also makes such tracking inaccurate. Hence, there exists a need to provide an improved cost recovery system capable of monitoring paper usage more accurately.

SUMMARY OF THE INVENTION

This invention is an apparatus and a method to automatically capture hard copy cost information that is a natural, accurate, and expressively powerful way to take advantage of Applicant's hard copy LAN infrastructure.

According to one aspect, an apparatus for tracking usage information for an image forming device includes an image forming device, processing circuitry and memory. The processing circuitry is associated with the image forming device and is operative to detect consumable usage information at the image forming device. The memory is coupled with the processing circuitry and is operative to store a data file containing the user information, the output job information, and the usage information.

According to another aspect, a hard copy output device usable with a local area network (LAN) and a client computer is provided which includes processing circuitry and memory. The processing circuitry communicates with the hard copy output device and is operative to receive LAN data packets from the client computer over the LAN that identifies a user and a print job. The memory is coupled with the processing circuitry and is operative to store a data file containing the LAN data packets and consumable usage information.

According to yet another aspect, a method of accounting for consumable usage for an image forming device includes collecting data identifying a user and a print job; storing the data in a memory of the image forming device; generating a print job with the image forming device; determining consumable usage data at the image forming device; and storing the consumable usage data in the memory of the image forming device.

One advantage results because the need to install, debug, and maintain special software on client PCs is eliminated.

Another advantage results because output job costs can be tracked with greater precision.

Yet another advantage results because cost information is piggybacked on a local area network (LAN) which eliminates the need for secondary communications links, and reduces the likelihood that the invention will be tricked into miscounting by packet sniffing.

Even another advantage is provided because users are not forced to enter and reenter domain log-in name security and/or validated user level information for the case where output jobs are submitted remotely over a local area network (LAN).

An even further advantage is provided because domain security is piggybacked which often eliminates the need to pay for ongoing maintenance of security such as by forcing users to change their passwords, and by forcing users to use additional passwords which can challenge a user by forcing them to remember a significant number of passwords that are continually changing.

DESCRIPTION OF THE DRAWINGS

Preferred embodiments of the invention are described below with reference to the following accompanying drawings depicting examples embodying the best mode for practicing the invention.

FIG. 2 is a block diagram illustrating in greater detail the hard copy cost recovery system of Applicant's invention.

FIG. 3 is a process flow diagram showing part of the logic processing for sequestering and/or polling output job information in order to realize hard copy cost recovery over a local area network (LAN).

DETAILED DESCRIPTION OF THE INVENTION

Figure 1:
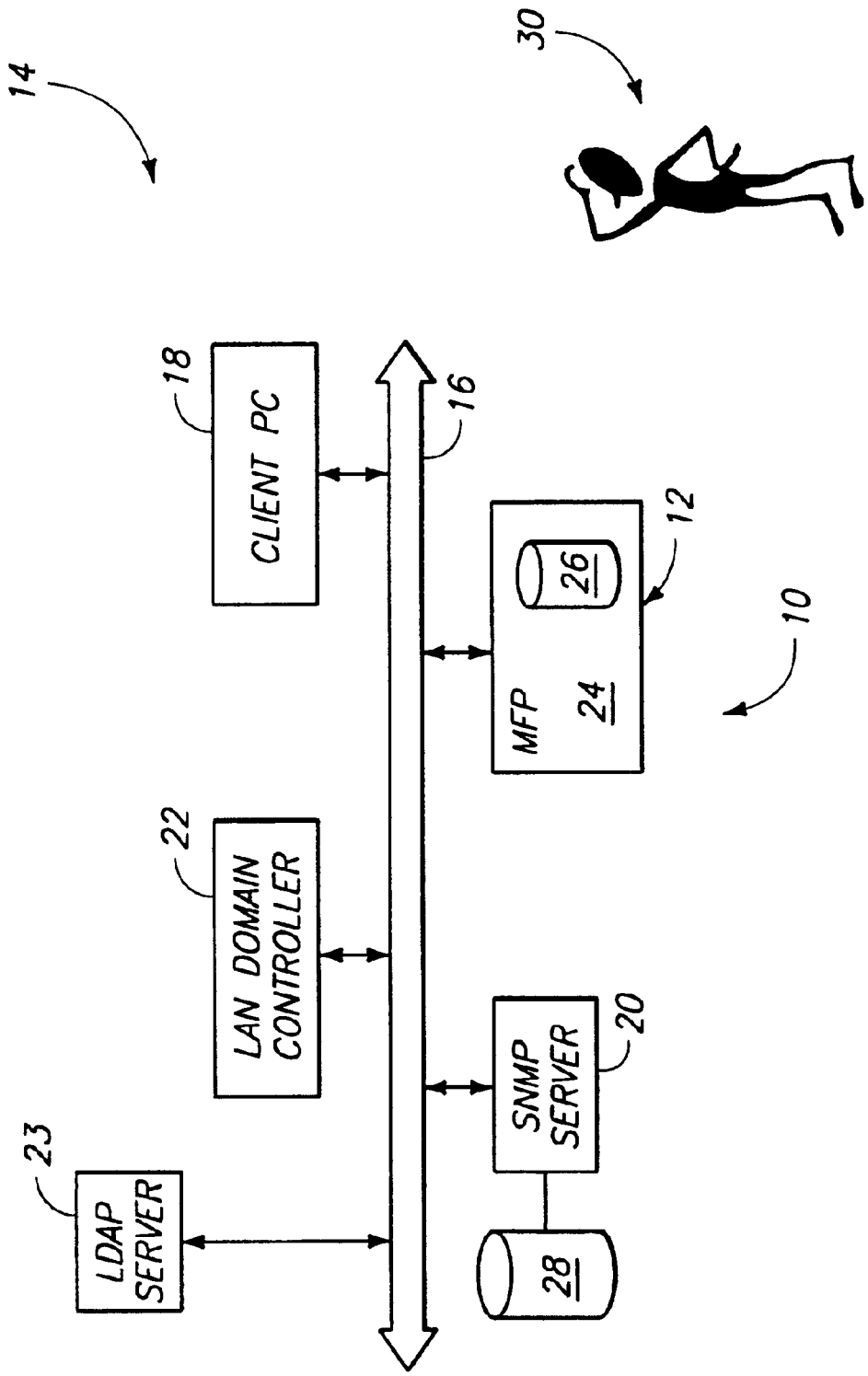
FIG. 1 is a block diagram of a computer system that includes a local area network (LAN), multiple client personal computers (PCs), an image forming device in the form of a hard copy output device, and a walk-up copy user, wherein a hard copy cost recovery system is provided pursuant to Applicant's invention.

This disclosure of the invention is submitted in furtherance of the constitutional purposes of the U.S. Patent Laws "to promote the progress of science and useful arts". U.S. Constitution, Article 1, Section 8.

FIG. 1 schematically illustrates in block diagram form the architecture of a hard-copy cost recovery system 10, which implements a preferred embodiment of the present invention. In one embodiment, hard-copy cost recovery system 10 is a tracking apparatus for monitoring usage of consumables that is implemented on an image forming device 12 within a local area network (LAN) environment 14. According to one construction, image forming device 12 comprises a hard copy output device. For purposes of this disclosure, the phrase "hard copy output device" is considered to be the equivalent of "hard copy device". One form of a hard copy device comprises a multiple-function peripheral (MFP) device that includes printer functionality.

As shown in FIG. 1, LAN environment 14 is a collection of computers and related devices such as servers and image forming devices that are connected to each other by wire or radio frequency devices, and which are typically placed within a local geographical region. In other embodiments, LAN environment 14 can be replaced with any other network computer system that enables printer functionality to be delivered by an image forming device.

According to FIG. 1, LAN environment 14 includes a local area network 16 to which one or more client personal computers (PCs) 18 are connected. Additionally, a simple network management protocol (SNMP) server 20, a LAN domain controller 22, and a lightweight directory access protocol (LDAP) server 23 are connected with LAN 16. Image forming device 12 is furthermore shown connected with LAN 16, in the form of a multiple-function peripheral (MFP) device 24. MFP 24 includes a data storage device in the form of a local memory, such as memory circuitry or a hard disk drive (HDD). Similarly, SNMP server 20 also includes an associated data storage device, or memory, 28 such as a hard disk drive (HDD).

According to one implementation of tracking apparatus 10 in FIG. 1, a walk-up copy user 30 is able to deliver a print job request to image forming device 12 either directly via a user interface 31 (see FIG. 2), or by way of client PC 18. Accordingly, tracking apparatus 10 is able to accurately collect usage information for consumables utilized to generate a print job with the image forming device 12. More particularly, as discussed below, consumable usage information includes total page area and toner used to cover the page area. Accordingly, determinations can be made as to the cost of the consumable resources that are utilized for any particular print job. Such usage information then enables proper allocation of costs to specific print jobs, which better enables a user to track costs for consumable usage and distribute such costs between particular print jobs and/or customers who have requested generation of such print jobs via LAN environment 14.

One exemplary application for tracking apparatus 10 of FIG. 1 involves the provision of LAN environment 14 within a law firm. A law firm application typically requires the generation of a number of different print jobs for specific individual clients. It may be desirable for a user to track the actual usage information for specific print jobs so that the costs for paper usage and toner usage can be properly allocated and billed to such clients, or customers.

In order to realize tracking apparatus 10, specific information is collected by image forming device 12 which describes toner coverage and paper used by the image forming device when generating individual pages and/or print jobs. Such methodology involves trapping toner coverage and paper-used information at the image forming device 12 in the form of data which allows the data to be collected where it can be evaluated and/or retrieved by LAN 16 and/or any device connected to LAN 16. More particularly, four kinds of information are collected and/or co-located within image forming device 12: (1) the location where costs have been incurred; (2) the job/page complete validation information; (3) consumables cost information; and (4) information describing print jobs including who generated the print job, from where the print job was generated, and when the print job was generated.

FIG. 2 illustrates in greater detail the apparatus and method of Applicant's invention. More particularly, FIG. 2 illustrates image forming device 12 which in one embodiment comprises a printer in the form of an MFP 24. Tracking apparatus 10 enables specific determination of where costs have been incurred simply by determining which image forming device 12 has fused toner onto one or more sheets of paper. Such information is collected by processing circuitry 38 which is provided by image forming device 12.

Job/page complete validation information is determined by tracking apparatus 10 when image forming device 12 increases page counts via processing circuitry 38. According to one construction, image forming device 12 is a printer. During generation of such print jobs, processing circuitry 38 counts the number of pages which are being delivered as output by image forming device 12. When a printing device increases page count via processing circuitry 38, it is nearly certain that such pages have been completely generated and passed through the output side of the fuser of printer 12. Although it is not necessarily exact, the monitoring of such page counting via processing circuitry 38 is significantly more accurate than if one were to count print jobs which have been generated via a LAN 16.

For example, it is possible that a user delivers a print job from PC 18 comprising a large number of copies of a single document. However, a user may proofread the first copy of the print job, and subsequently cancel the remaining copies because a typographical error has been identified. The cancelling of the remaining print job, and remaining copies, under prior art systems would mean that all of the copies would be counted as having been printed. However, pursuant to Applicant's invention, a more accurate count would be taken by monitoring the page count produced by processing circuitry 38 such that only the first copy would be counted, and the cancelled print job (and remaining copies) would not be counted. Therefore, a more accurate page count is produced by monitoring the page counts delivered by processing circuitry 38 as jobs are being delivered as output from an image forming device 12. Accordingly, a much more certain page count is generated than would be generated using prior art client PC-based software counters, such as are provided by Equitrac Corporation.

As shown in FIG. 2, client PC 18 includes a client data file 32 in which user information 34, print job information 35, and usage information 36 are stored. It is understood that client data file 32 is stored in a data storage device, or memory (not shown), within PC 18. It is further understood that PC 18 includes processing circuitry in the form of a microprocessor and associated input/output devices that enable communication with LAN 16. When a print job is submitted by a user at PC 18, user information 34 and print job information 35 are stored directly on PC 18, and usage information 36 is retrieved from image forming device 12 where it is generated and also stored. For the case where a user generates a print job request via image forming device 12, it is possible that user information 34 and print job information 35 are also delivered to PC 18 via LAN 16 and image forming device 12.

Image forming device 12 of FIG. 2 comprises a hard copy output device, or hard copy device, such as a laser printer or a multiple function peripheral (MFP) device. Alternatively, image forming device 12 can form any device capable of generating output, such as print jobs, and including facsimile machines, copiers, and printers. Image forming device 12 includes a microprocessor comprising processing circuitry 38, memory 26, and a user interface 50. Memory 26 and user interface 50 communicate with processing circuitry 38, while processing circuitry 38 connects image forming device 12 in communication with LAN 16.

Memory 26 forms a data storage device in which a device data file 40 is collected and stored via processing circuitry 38. Device data file 40 includes data packets 42 comprising user information 34 and print job information 35. Data packets 42 are delivered via processing circuitry 38 to memory 26. According to one implementation, processing circuitry 38 retrieves data packets 42 from PC 18 where they are generated via LAN 16. According to another implementation, processing circuitry 38 generates data packets 42 internally within image forming device 12 where a user submits a print job directly to image forming device 12 via user interface 50.

Device data file 40 also includes consumable usage information 36 comprising cost information for the total page area 44 and toner coverage 48 utilized by printing individual pages and/or print jobs. Accordingly, an image forming device 12, or printer, using tracking apparatus 10 of Applicant's invention can keep track of the costs incurred when printing a print job. More particularly, a user can keep track of the number of pages of paper that are utilized and the amount of toner that is utilized when generating a print job. Accordingly, the costs for generating such a print job can be passed on to the requestor of the print job, such as a client who has requested that work be done by a law firm utilizing such tracking apparatus 10. Similarly, a group of individuals can each be utilizing a dedicated client PC 18, and costs for print jobs can be tracked back to each specific individual client PC 18. In this manner, charges for submission and printing of print jobs can be correlated with specific users and/or requestors of print jobs that have been generated.

Additionally, image forming device 12 includes a management information base (MIB) 48 provided within memory 26. MIB 48 is used to keep track of job completion information, as well as other information, and comprises a network database that stores information about a network's configuration and performance.

User interface 50 of image forming device 12 includes a keyboard 52 and a display 54 which enables a walk-up copy user to interact with image forming 12. For example, where image forming device 12 comprises a copier, a walk-up copy user can initiate a copy job via keyboard 52 and display 54. Additionally, a walk-up user can input a user identification (ID) via user interface 50. Such input can include delivery of a user identification and a password. As another example, a user can submit a print job via keyboard 52 and display 54, or optionally via PC 18, to image forming device 12 when provided in the form of a printer. Furthermore, user interface 50 includes a smart card reader 56. A walk-up copy user can present a smart card to reader 56 which provides such reader and image forming device 12 with user information 34 and/or print job information 35.

Tracking apparatus 10 of FIG. 2 collects consumables cost information by computing page-area cost and toner coverage via processing circuitry 38. More particularly, processing circuitry 38 implements an algorithm as shown in FIG. 3 which counts page-area 44 and toner coverage 46 and which is collected at image forming device 12 on a print job-by-print job basis. For example, where image forming device 12 is a printer, a print job is delivered to device 12 by a user, and processing circuitry 38 computes the number of pages, or page-area cost associated with generating the print job, as well as computing the toner coverage by counting the pixel coverage used to generate the print job. Accordingly, accurate cost information can be collected which details the total page-area 44 and total toner coverage 46 required for a specific print job. In this manner, the total cost is made available to device 12 in the form of usage information 36. Such usage information 36 can then be associated with user information 34 and print job information 35, within device data file 40. Device data file 40 can furthermore be made available to a user via LAN 16, PC 18, servers 20 and 23, and controller 22.

Finally, tracking apparatus 10 can collect additional print job information that describes who submitted the print job, from where the print job originated, and when the print job was generated. Such information is trapped at the printer within device data file 40 which increases the veracity of the data that is collected within file 40 because the data is logically attached to a print job that is being processed by processing circuitry 38. Accordingly, there is less likelihood that inaccurate information will be attached to the usage information 36. Therefore, more accurate hard-copy cost recovery can be realized.

The ability for tracking apparatus 10 to provide the above data in a unified manner means that a more accurate determination can be made as to how many pages have been printed, what toner coverage has been used, who printed the print jobs, when have the print jobs been printed, where have the print jobs been printed, and more importantly, verification that a print job was completed so that costs can be accurately incurred and distributed to requestors of such print jobs and/or to users who have submitted such print jobs. In order to better understand implementation of Applicant's invention, two example cases are described below which detail exemplary implementations of Applicant's invention according to the depiction of tracking apparatus 10 shown in FIG. 1.

EXAMPLE CASE 1

For example, a user 30 logs in at his/her PC as shown in FIG. 1, submitting a login name and password. The user's log-in name and password are checked by the domain controller 22. The user then proceeds to create and print a short memo to a network-connected MFP 24. LAN packets carrying the print job to the MFP 24 include the user's LAN log-in name which is trapped by the MFP firmware, and is joined with page-area and toner coverage information when the print job has completed.

Packet data identifying user 30 and the print job are trapped by the MFP firmware and sequestered on the MFP hard disk or memory 26. When the print job completes, the MFP 24 computes coverage and page area and joins this information to the trapped user/print job information. As print jobs arrive at the MFP 24, MFP 24 builds a data file of user/print job/cost information on its hard disk 26.

A resulting data file 40 (see FIG. 2) is a census result transaction data file where everything fused in MFP 24 gets counted. A census result transaction file comprising device data file 40 (of FIG. 2) is the raw material of true commercial-grade cost accounting information. For example, user information can be used to roll costs up into departments via a second user-to-department data table.

By trapping, joining, and co-opting LAN packets generated for other purposes, Applicant can build transaction data of high usefulness at a near-zero added cost to the image forming device and local area network.

EXAMPLE CASE 2

A walk-up user 30 desires to make a duplex copy of a two-page, two-sided document. If the user interface 50 (of FIG. 2) forces user 30 to log-in using a LAN-login-name and password, MFP 24 can then trap the user name and time from the data packets it is passing to and from the domain controller 22.

Alternatively, a swipe card or smart card can be input by a user to smart card reader 56 (of FIG. 2) and be validated locally at MFP 24. In this case, user ID information can still be trapped, sequestered on disk or memory 26, and merged with cost data upon job completion.

Upon completion of the copy job, the page-area and coverage information can be joined to the user information and sequestered on the MFP's hard disk or memory 26.

According to another aspect of Applicant's invention, a second key methodology is provided by tracking apparatus 10 wherein hybrid pull-push data gathering is implemented. More particularly, SNMP server 20 on LAN 16 is used to poll image forming devices 12, such as MFP 24, in order to collect transaction details before the MFP's memory 26 overflows. If MFP 24 is not polled before an overflow event occurs with memory 26, MFP 24 can be configured to push the transaction details through LAN 16 and to SNMP server 20 where such details can be stored on memory 28.

By combining the above two techniques illustrated in Example 2, transaction details of unprecedented veracity and usefulness can be realized via Applicant's invention, without imposing the costs of metering which result when utilizing competitive prior art technologies. For example, the utilization of most prior art cost recovery systems imposes significant costs in hardware and software which must be utilized in order to meter the utilization of paper in an image forming device.

Accordingly, several advantages are provided by implementing Applicant's invention; namely, the need to install, debug and maintain software on a client's PC is eliminated. The ability to more precisely track cost is increased by eliminating the averaging of costs. Instead, costs can be taken directly from MIB entries of completed hard-copy events. Furthermore, by breaking pixels/toner usage and paper into separate categories of costs, a user can better automatically measure costs on a 100% pay-for-what-you-use basis.

Additionally, cost information can be piggybacked onto an existing local area network, thereby eliminating the need for secondary RS422/current loop communications, and reducing the likelihood that an invention will be tricked into miscounting consumable usage. For example, such tricking can occur when miscounting is realized by packet sniffing techniques. Additionally, where a sequestering/polling approach piggybacks with the existing domain login name security, validated user level information can typically be collected without forcing a user to enter and re-enter such data. The entry and re-entry typically occurs where a print/copy job is not submitted by a walk-up user. In many cases, this will eliminate the need for artificial accounting data collection systems, such as user code numbers, which otherwise need to be created.

Even another benefit of piggybacking domain security onto a LAN results in that, in many cases, such piggybacking will eliminate the need to pay for ongoing maintenance of security. For example, there will no longer be a need for a system administrator to repeatedly remind and force users to change their passwords and utilize highly effective passwords in order to maximize security.

FIG. 3 illustrates a process flow diagram that is programmed onto processing circuitry of an image forming device in order to implement Applicant's invention. In Step "S1", the processing circuitry is implemented to collect data identifying a user and a print job. After performing Step "S1", the process proceeds to Step "S2".

In Step "S2", the processing circuitry is implemented to store data in memory of the image forming device. After performing Step "S2", the process proceeds to Step "S3".

In Step "S3", the processing circuitry is implemented to generate one or more print jobs with the image forming device. After performing Step "S3", the process proceeds to Step "S4".

In Step "S4", the processing circuitry is implemented to determine consumable usage data at the image forming device. For example, page usage data and toner usage data are determined for the image forming and a particular print job. After performing Step "S4", the process proceeds to Step "S5".

In Step "S5", the processing circuitry is implemented to store the consumable usage data in memory of the image forming device. After performing Step "S5", the process proceeds to Step "S6".

In Step "S6", the processing circuitry is implemented to retrieve user, print job and consumable usage data from memory of the image forming device. After performing Step "S6", the process is terminated.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for tracking usage information for a hard copy output device, comprising:
   an image forming device; and
   a tracking apparatus provided on the image forming device and having:
   processing circuitry associated with the image forming device;
   computer program code implemented on the processing circuitry and operative to count page-area and toner coverage delivered as output by the image forming device and collected on a print job-by-print job basis; and
   memory coupled with the processing circuitry and operative to store a data file containing user information, output job information, and usage information comprising total page area used and toner used to cover the total page area used;
   wherein the tracking apparatus is configured to implement hybrid pull-push data gathering of transaction details from the image forming device including consumable usage information.

2. The apparatus of claim 1 wherein the data file is a census transaction data file comprising cost accounting information of consumables utilized by the image forming device when generating output jobs.

3. The apparatus of claim 2 wherein the total page area comprises paper usage and the output job information comprises information detailing a print job.

4. The apparatus of claim 1 further comprising a plurality of image forming devices, and wherein the tracking apparatus polls the image forming devices to collect transaction details at each of the image forming devices, and wherein at least one of the image forming devices is configured to push the transaction details to the tracking apparatus, if not polled, prior to a memory overflow event occurring on the at least one image forming device.

5. The apparatus of claim 4 further comprising a user interface configured to receive unique user identification information from a user at the image forming device, wherein the processing circuitry receives the user identification information and merges the user identification information with cost data upon job completion.

6. The apparatus of claim 5 further comprising a domain controller, wherein a user submits a print job to the image forming device from the client computer, and wherein the domain controller verifies identification of the user.

7. The apparatus of claim 1 wherein the image forming device includes a user interface, and wherein a walk-up user submits a copy job to the image forming device via the user interface.

8. The apparatus of claim 7 wherein the user interface includes a reader operative to identify the walk-up user.

9. A hard copy output device usable with a local area network (LAN) and a client computer, comprising:
   a tracking apparatus configured for use on a hard copy output device having:
   processing circuitry associated with the hard copy output device, configured to monitor page count delivered as output by the hard copy output device and operative to receive LAN data packets from the client computer over the LAN that identify a user end a print job; and
   memory coupled with the processing circuitry and operative to store a data file containing the LAN data packets and consumable usage information including actual toner usage; and
   wherein the tracking apparatus is configured to implement hybrid pull-push data gathering of transaction details including consumable usage information from the hard copy output device, the LAN includes a plurality of hard copy output devices, and the tracking apparatus is configured to poll the plurality of hard copy output devices to collect the transaction details at each of the hard copy output devices, and wherein at least one of the hard copy output devices is configured to push the transaction details to the tracking apparatus that is not polled prior to a memory overflow event occurring on the at least one hard copy output device.

10. The hard copy device of claim 9 wherein the consumable usage information comprises paper usage and toner usage collected at the hard copy output device corresponding with print job completion.

11. The hard copy device of claim 10 further comprises a user interface configured to enable a user to input a user identification.

12. The hard copy device of claim 9 wherein cost information is collected at the hard copy output device on a print-job-by-print-job basis.

13. The hard copy device of claim 9 wherein the hard copy output device increments page counts to obtain cost information.

14. The hard copy device of claim 9 further comprising an LDAP server and a local area network (LAN), wherein the LDAP server maintains user information and is operative to implement consumable cost recovery.

15. A method of accounting for consumable usage for an image forming device, comprising:

collecting data identifying a user and a print job;

storing the data in a memory of the image forming device;

generating a print job with the image forming device;

determining consumable usage data including toner usage and page count delivered as output by the image forming device on a print job-by-print job basis;

storing the consumable usage data in the memory of the image forming device in the form of a device data file including user information and usage information; and obtaining transaction details and consumable usage information from the image forming device using a hybrid pull-push data gathering scheme to transfer information with the device data file.

16. The method of claim 15 wherein the step of storing the consumable usage data in the memory comprises storing the page usage and the toner usage in the memory associated with the data identifying the user and the print job.

17. The method of claim 15 wherein the data identifying a user and a print job comprises packet data including a user login name and password.

18. The method of claim 17 wherein the step of collecting packet data is carried out at a client personal computer, and further comprising generating a transaction data file including cost accounting information and generating a data file in the memory of the image forming device correlating the data identifying the user, the print job, and the cost accounting information.

19. The method of claim 15 wherein the step of generating a print job comprises requesting a print job from a client computer and forwarding the request over a local area network to the image forming device.

20. An apparatus for tracking usage information for an image forming device, comprising:

an image forming device; and a tracking apparatus provided on the image forming device and having:

processing circuitry associated with and provided within the image forming device;

computer program code implemented on the processing circuitry and operative to count page-area and toner coverage at the image forming device collected on a print job-by-print job basis;

memory coupled with the processing circuitry and operative to store a data file containing the user information, the output job information, and the usage information comprising total page area used and toner used;

wherein the tracking apparatus is configured to implement hybrid pull-push data gathering of transaction details including consumable usage information from the image forming device; and wherein number of pages printed by the image forming device is determined by counting pages printed downstream of a fuser on an output side of the image forming device.

21. An apparatus for tracking usage information for an image forming device, comprising:

a tracking apparatus configured for use on an image forming device and having:

processing circuitry associated with and provided within the image forming device;

computer program code implemented on the processing circuitry and operative to count page-area and toner coverage at the image forming device collected on a print job-by-print job basis;

memory coupled with the processing circuitry and operative to store a data file containing the user information, the output job information, and the usage information comprising total page area used and toner used for print jobs that are actually processed by the image forming device; and wherein the tracking apparatus is configured to implement hybrid pull-push data gathering of transaction details from the image forming device including consumable usage information; and wherein number of pages printed by the image forming device is determined by counting pages printed on an output side of a fuser of the image forming device.

* * * * *